United States Patent
Laninga et al.

[11] Patent Number: 6,116,791
[45] Date of Patent: Sep. 12, 2000

[54] OPTICAL COUPLER AND METHOD FOR COUPLING AN OPTICAL FIBER TO AN OPTOELECTRIC DEVICE

[75] Inventors: Albert John Laninga, Tempe; James H. Knapp, Chandler; Laura J. Norton, Apache Junction, all of Ariz.; Joseph E. Sauvageau, Boulder, Colo.

[73] Assignee: Motorola, Inc., Schaumburg, Ill.

[21] Appl. No.: 09/088,009

[22] Filed: Jun. 1, 1998

[51] Int. Cl.[7] ..................................... G02B 6/36
[52] U.S. Cl. ............................................... 385/83
[58] Field of Search .................... 385/80–88, 147

[56] References Cited

U.S. PATENT DOCUMENTS

| | | | |
|---|---|---|---|
| 3,846,010 | 11/1974 | Love et al. | 350/96 |
| 4,943,136 | 7/1990 | Popoff | 350/96.16 |
| 5,093,879 | 3/1992 | Bregman et al. | 385/93 |
| 5,175,790 | 12/1992 | Groh et al. | 385/143 |
| 5,202,943 | 4/1993 | Carden et al. | 385/92 |
| 5,228,101 | 7/1993 | Lebby et al. | 385/91 |
| 5,230,030 | 7/1993 | Hartman et al. | 385/50 |
| 5,337,391 | 8/1994 | Lebby | 385/88 |
| 5,345,527 | 9/1994 | Lebby et al. | 385/114 |
| 5,359,686 | 10/1994 | Galloway et al. | 385/49 |
| 5,389,312 | 2/1995 | Lebby et al. | 385/88 |
| 5,416,872 | 5/1995 | Sizer, II et al. | 385/89 |
| 5,420,954 | 5/1995 | Swirhun et al. | 385/92 |
| 5,432,630 | 7/1995 | Lebby et al. | 359/152 |
| 5,473,716 | 12/1995 | Lebby et al. | 385/88 |

OTHER PUBLICATIONS

"Plastic–Based Receptacle–Type VCSEL–Array Modules with One and Two Dimensions Fabricated Using the Self–Alighnment Technique" Kosaka, Kajita, Yamada, Sugimoto, Kurata, Tanabe and Kasukawa, 1997 Proceedings 47th Electronic Components & Technology Conference May 18–21, 1997, San Jose, California, pp. 382–390.

"A New Type of Demountable Plastic–Molded Single–Mode Multifiber Connector" Toshiaki Satake, Shinji Nagasawa, and Ryosuke Arioka, Journal of Lightwave Technology, vol. Lt–4, No. 8, Aug. 1986, pp. 1232–1236.

*Primary Examiner*—Akm E. Ullah
*Attorney, Agent, or Firm*—Robert F. Hightower

[57] ABSTRACT

An optical coupler (60) includes of an optical connector (10) coupled to an optoelectric board (64). An optical fiber (50) is inserted into the optical connector (10). The optical fiber (50) is bent to an angle of approximately 90° inside the optical connector (10). A tip (55) of the optical fiber (50) is substantially perpendicular to the optoelectric board (64) and aligned to an optical region of an optoelectric device (62) on the optoelectric board (64). A portion of the optical fiber (50) outside the optical connector (10) is substantially parallel to the optoelectric board (64). A fiber retainer (30) secures the optical fiber (50) to the optical connector (10).

22 Claims, 6 Drawing Sheets

OPTICAL COUPLER AND METHOD FOR COUPLING AN OPTICAL FIBER TO AN OPTOELECTRIC DEVICE

BACKGROUND OF THE INVENTION

The present invention relates, in general, to interconnects and, more particularly, to optical interconnects.

Optical fiber technology is used in a variety of applications such as telecommunication, computer, and medical applications. An important aspect of optical fiber technology is the coupling of an optical fiber to an optoelectronic device for transmitting information conducted by the optical fiber.

Optical fibers are typically arranged in a bundle and protected by a sheath. Such a bundle of optical fibers is often referred to as an optical cable. The light receiving and emitting ends of the optical fibers are housed in fiber ferrules. The fiber ferrule at the light receiving end of the bundle is coupled to a light emitting device via an optical interface unit. Likewise, the fiber ferrule at the light emitting end of the bundle is coupled to a light detecting device via an optical interface unit.

A drawback of these systems is the large number of optical interface or coupling points through which the optical signals pass. In currently available systems, optical signals pass through at least four interfaces, i.e., interfaces between the optical interface units and the light emission and detection devices and interfaces between the optical interface units and the fiber ferrules. Each time the optical signal passes through an optical interface, a portion of the signal is lost, thereby degrading the quality of the optical signals transmitted in optical fibers.

In addition, for convenience and space efficiency, it is generally preferred to arrange optical fibers parallel to a circuit board. Therefore, when a vertical light emitting or detection device such as, for example, a vertical cavity surface emitting Laser (VCSEL) or photodetector is coupled to optical fibers, the chip that includes the vertical light emitting or detection device is mounted perpendicular to the circuit board. The perpendicular orientation of the vertical light emitting or detection device can be accomplished by several means, e.g., flexible circuits using tape automated bonding (TAB), electrically patterned submounts connected to the circuit board, etc. However, flexible circuits and submounts are additional components that are often expensive. Further, flexible circuits and submounts increase the electronic paths of the light emitting or detection devices and, therefore, degrade their performance.

Accordingly, it would be advantageous to have an optical coupler and a method for coupling an optical fiber to an optoelectronic device that reduce the signal loss along an optoelectronic path. It is desirable for the method to decrease the electronic paths of the optoelectronic devices, thereby enhancing its performance. It is also desirable for the method to reduce the optical losses thereby increasing the efficiency of the optical interconnect. It is also desirable for the coupler to be simple and easily manufacturable. It would be of further advantage for the method to be simple, easily manufacturable, and cost efficient.

Figure 1:
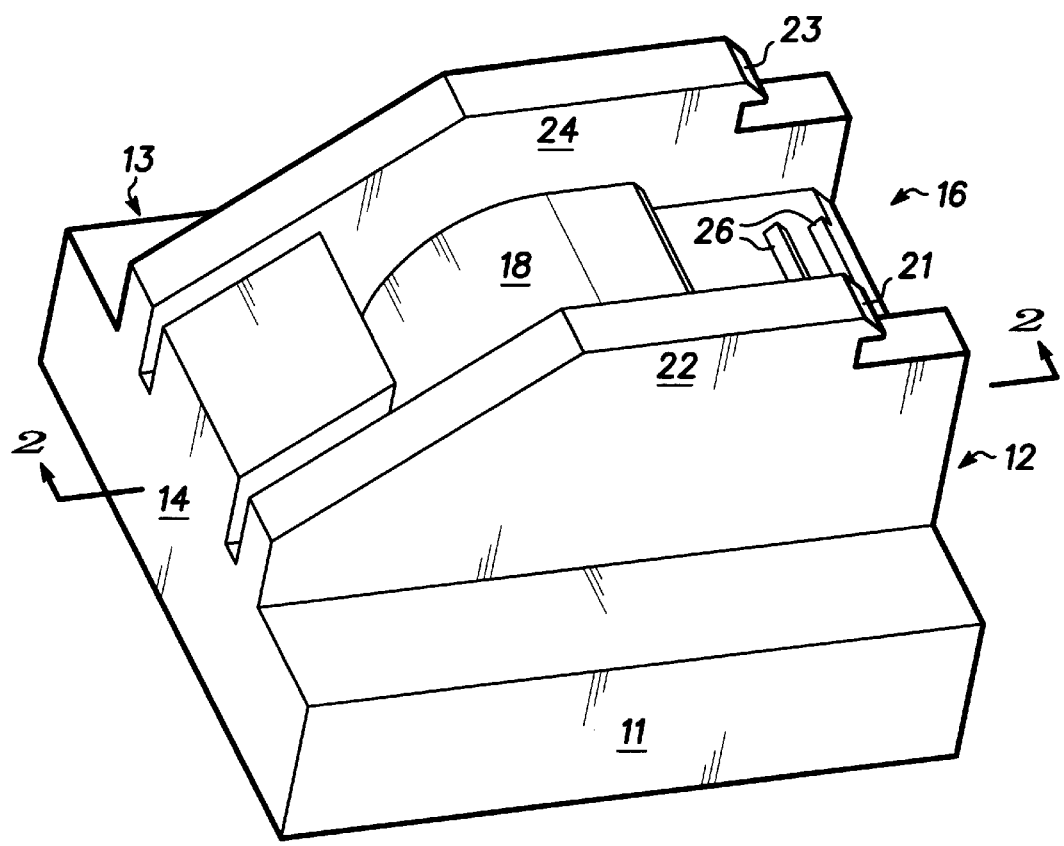
FIG. 1 is an isometric view of an optical connector in accordance with a first embodiment of the present invention.

It should be understood that for simplicity and clarity of illustration, the figures are not necessarily drawn to scale. It should also be understood that, where considered appropriate, reference numerals are repeated among the figures to indicate corresponding or analogous elements.

DETAILED DESCRIPTION OF THE DRAWINGS

Generally, the present invention provides an optical fiber coupler, or simply an optical coupler. The present invention also provides a method of coupling an optical fiber to an optoelectric device. More particularly, the optical coupler is comprised of an optical connector coupled to an optoelectric board. An optical fiber is inserted into the optical connector. The optical fiber is bent inside the optical connector. A tip of the optical fiber is substantially perpendicular to the optoelectric board and aligned to an optical region of an optoelectric device on the optoelectric board. In accordance with one embodiment, the optical fiber is bent to an angle of approximately 90° inside the optical connector, and a portion of the optical fiber outside the optical connector is substantially parallel to the optoelectric board. Typically, the optical coupler of the present invention is used for coupling a bundle of optical fibers to an optoelectronic device such as, for example, a vertical cavity surface emitting laser (VCSEL), a photodetector, or the like. Accordingly, the tip of each optical fiber in the bundle of optical fibers is aligned to a corresponding aperture of the optoelectronic device.

Figure 2:
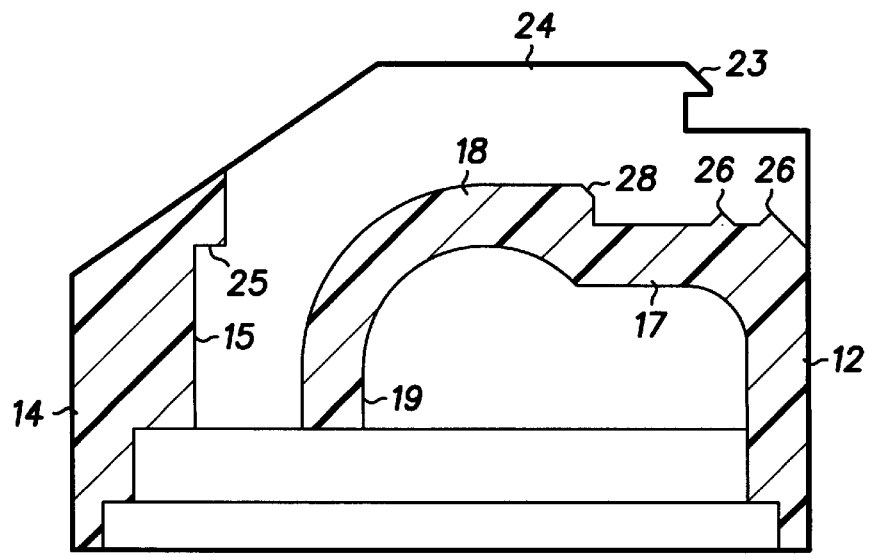
FIG. 2 is a cross-sectional view of the optical connector of FIG. 1 along a cross-sectional plane 2—2.

An optical connector 10 in accordance with a first embodiment of the present invention is shown in FIGS. 1 and 2. More particularly, FIG. 1 is an isometric view of optical connector 10, and FIG. 2 is a cross-sectional view of optical connector 10 along a cross-sectional plane 2—2 shown in FIG. 1. By way of example, optical connector 10 is made of a plastic material with high glass transition temperature such as, for example, thermoplastic liquid crystalline polymer, thermoset, or the like. Optical connector 10 includes sidewalls 11, 12, 13, and 14. Sidewalls 11 and 13 are opposite to each other, and sidewalls 12 and 14 are opposite to each other. An inner surface 15 of sidewall 14 is facing sidewall 12. Sidewall 12 has a notch 16 formed thereon. Sidewall 11, 12, 13, and 14 surrounds a fiber guide 18 that has a first portion 17 extending from sidewall 12 adjacent notch 16 and a second portion 19 adjacent sidewall 14. Portion 17 of fiber guide 18 is substantially perpendicular to sidewall 12. Portion 19 of fiber guide 18 is substantially perpendicular to portion 17 and substantially parallel to inner surface 15 of sidewall 14. Optical connector 10 also includes rails 22 and 24 coupled between sidewalls 12 and 14, one rail on each side of fiber guide 18. Rail 22 has a catching tab 21 formed thereon and adjacent notch 16, and rail 24 has a catching tab 23 formed thereon and adjacent notch 16. Inner surface 15 of sidewall 14 has a catch 25 formed thereon. Optical connector 10 further has teeth 26 formed on sidewall 12 in notch 16. A step 28 is formed in portion 17 of fiber guide 18.

Figure 3:
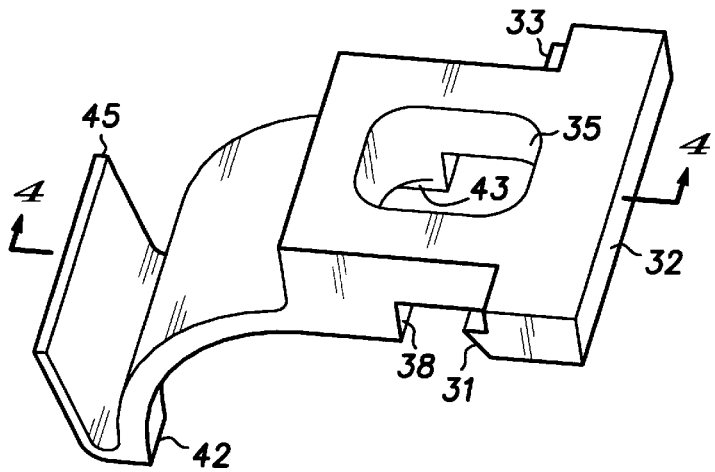
FIG. 3 is an isometric view of an optical fiber retainer in accordance with the present invention.
Figure 4:
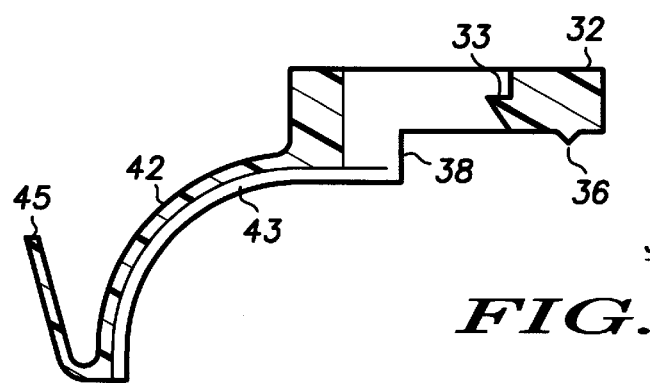
FIG. 4 is a cross-sectional view of the optical fiber retainer of FIG. 3 along a cross-sectional plane 4—4.

An optical fiber retainer 30 in accordance with the present invention is illustrated in FIGS. 3 and 4. More particularly, FIG. 3 is an isometric view of optical fiber retainer 30, and FIG. 4 is a cross-sectional view of optical fiber retainer 30 along a cross-sectional plane 4—4 shown in FIG. 3. By way of example, fiber retainer 30 is made of a high temperature plastic material. Fiber retainer 30 is used in combination with optical connector 10 of FIGS. 1 and 2 to form an optical coupler. A first portion of fiber retainer 30 is referred to as a lid 32. Lid 32 has protrusions 31 and 33 protruding therefrom. Protrusions 31 (shown in FIG. 3) and 33 snap into tab 21 (shown in FIG. 1) on rail 22 and tab 23 on rail 24, respectively, when fiber retainer 30 is mounted on optical connector 10. A hole 35 is formed in lid 32. Fiber retainer 30 also includes a tooth 36 formed on lid 32. A step 38 is formed in 32. When fiber retainer 30 is mounted on optical connector 10, tooth 36 are opposite to teeth 26 in notch 16, and step 38 is opposite to step 28 on fiber guide 18 of optical connector 10. A second portion of fiber retainer 30 is curved and referred to as a flexure 42. The shape of flexure 42 matches that of portion 19 of fiber guide 18 (shown in FIG. 2). There is a recessed area 43 on flexure 42 that faces fiber guide 18 when fiber retainer is coupled to optical connector 10 of FIGS. 1 and 2. In other words, flexure 42 is conformal to portion 19 of fiber guide 18. Fiber retainer 30 also includes a pawl 45 extending from flexure 42. When fiber retainer 30 is mounted on optical connector 10, flexure 42 is inserted between fiber guide 18 and sidewall 14 of optical connector 10, and pawl 45 snaps into catch 25 on inner surface 15 of sidewall 14 of optical connector 10.

Figure 5:
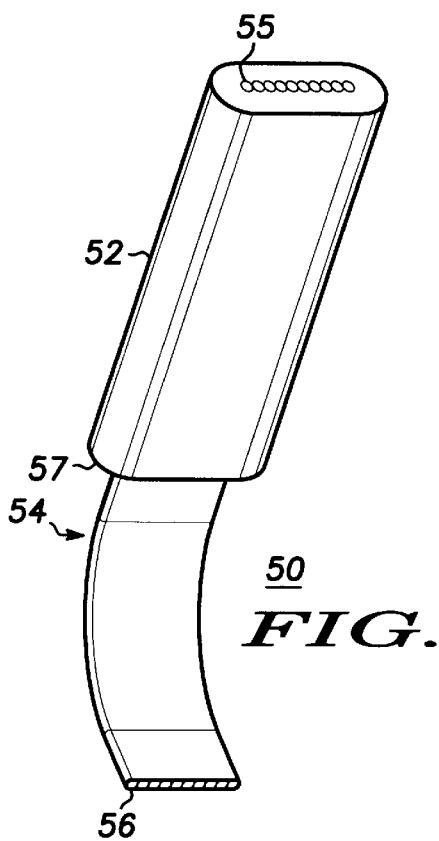
FIG. 5 illustrates of an optical cable in accordance with the present invention.

FIG. 5 illustrates an optical cable 50 in accordance with the present invention. Optical cable 50 includes a plurality of optical fibers in a collinear arrangement bundled together using laminating or molding techniques known in the art. The tips of the optical fibers are preferably polished. A sheath 52 surrounds the bundle of optical fibers. Sheath 52 has an end 57 and is absent from a portion 54 of the bundle of optical fibers. FIG. 5 shows an optical fiber 55 in the bundle of optical fibers. having a tip 56. It should be noted that portion 54 of optical cable 50 is not bent in its natural state. FIG. 5 shows the state of optical cable 50 when it is inserted between optical connector 10 and fiber retainer 30 as described hereinafter.

Figure 6:
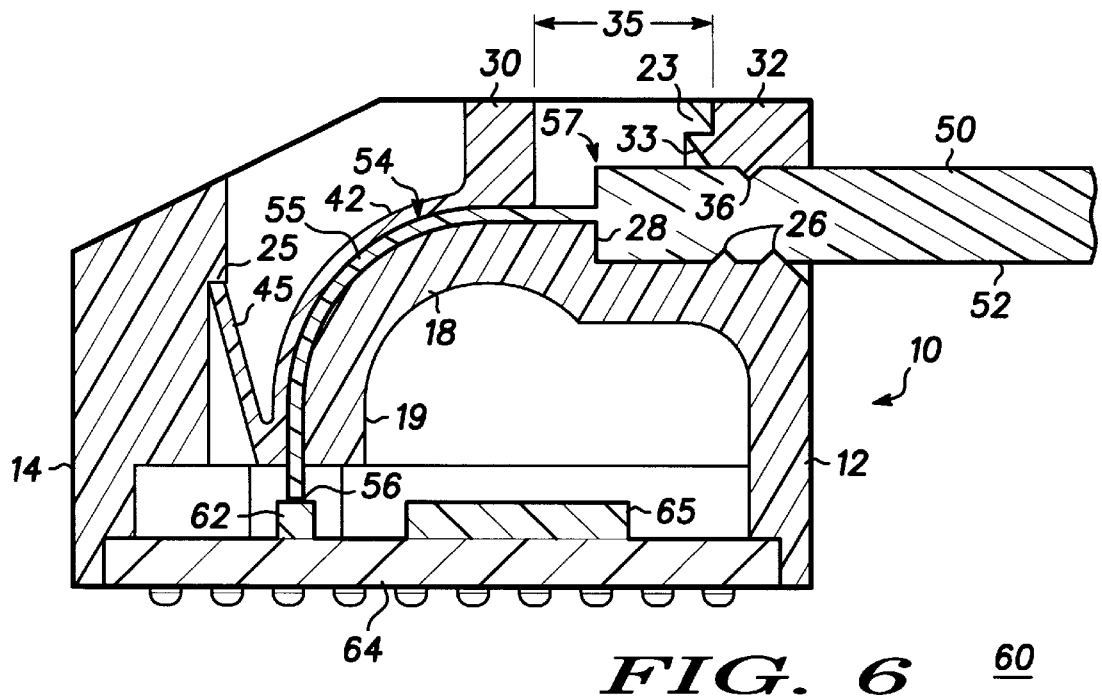
FIG. 6 is a cross-sectional view of an optical coupler in accordance with the first embodiment of the present invention.

FIG. 6 is a cross-sectional view of an optical coupler 60 in accordance with the first embodiment of the present invention. Optical coupler 60 includes optical connector 10 of FIGS. 1 and 2 and optical fiber retainer 30 of FIGS. 3 and 4. Optical coupler 60 also includes an optoelectric device such as, for example, a multi-channel VCSEL 62 mounted on a optoelectric board 64. Corresponding to each channel in multi-channel VCSEL 62, there is an aperture (not shown) on the surface of VCSEL 62. By way of example, optoelectric board 64 is a ball grid array (BGA) board. An integrated circuit (IC) die 65 is also attached to optoelectric board 64. VCSEL 62 and IC die 65 can be mounted on optoelectric board 64 using conventional bonding techniques. Optical connector 10 and fiber retainer 30 cooperate with each other to couple optical cable 50 to VCSEL 62. Preferably, the number of optical fibers in optical cable 50 is at least equal to the number of channels in multi-channel VCSEL 62. In addition, the pattern of optical fibers matches the pattern of the apertures on VCSEL 62. For example, both the apertures on the surface of VCSEL 62 and the optical fibers in optical cable 50 are arranged in straight lines. The process of assembling optical coupler 60 includes mounting optoelectric board 64 to optical connector 10, mounting fiber retainer 30 to optical connector 10, inserting optical cable 50 into optical connector 10, and securing the optical cable 50 to optical connector 10.

Mounting optoelectric board 64 to optical connector 10 includes aligning VCSEL 62 to fiber guide 18 and attaching optoelectric board 64 to optical connector 10. Before being mounted to optical connector 10, optoelectric board 64 preferably has a surface area larger than a area around portion 19 of fiber guide 18 and defined by sidewalls 11, 12, 13, and 14 of optical connector 10. Using a pattern identification technique, the apertures (not shown) on the surface of VCSEL 62 are identified. The position of optoelectric board 64 relative to optical connector 10 is adjusted so that the apertures on VCSEL 62 are aligned to portion 19 of fiber guide 18. While the apertures are aligned to portion 19 of fiber guide 18, optoelectric board 64 is cut to form four edges that match sidewalls 11, 12, 13, and 14 of optical connector 10. Accordingly, when optoelectric board 64 is attached to optical connector 10, the edges of optoelectric board 64 cooperate with sidewalls 11, 12, 13, 14 of optical connector 10 to position the apertures of VCSEL 62 adjacent portion 19 of fiber guide 18. Optoelectric board 64 can be attached to optical connector 10 using a fastener, an adhesive, etc. Alternatively, optoelectric board 64 can be snapped into at least one tab (not shown) formed on at least one of sidewalls 11, 12, 13, and 14 of optical connector 10.

Flexure 42 of fiber retainer 30 is inserted into a space between portion 19 of fiber guide 18 and sidewall 14. Pawl 45 snaps into catch 25 on sidewall 14, thereby securing flexure 42 of fiber retainer 30 to optical connector 10. Portion 54 of the bundle of optical fibers not covered in sheath 52 is inserted into a space between flexure 42 and fiber guide 18. Recessed area 43 (shown in FIG. 3) on flexure 42 of fiber retainer 30 guides portion 54 of optical cable 50 so that the ends or tips of the optical fibers are adjacent and directly over corresponding apertures on the surface of VCSEL 62. FIG. 6 shows tip 56 of optical fiber 55 directly over an aperture (not shown) on the surface of VCSEL 62. Preferably, the length of portion 54 of the bundle of optical fibers extending from sheath 52 is substantially equal to or slightly less than a distance between step 28 on fiber guide 18 and VCSEL 62 along portion 19 of fiber guide 18. Therefore, when the tips of the optical fibers are directly over and aligned with corresponding apertures on VCSEL 62, end of sheath 52 is at step 28 of fiber guide 18. Lid 32 of fiber retainer 30 is then pushed toward sidewall 12 of optical connector 10. Protrusions 31 and 33 snap into tabs 21 and 23, respectively. Lid 32 presses optical cable 50 against notch 16 (shown in FIG. 1) on sidewall 12 of optical connector 10. Teeth 26 on notch 16 and tooth 36 on lid 32 grip sheath 52, thereby securing optical cable 50 to optical connector 10. Optionally, glue can be applied through hole 35 in lid 32 to secure optical cable 50 to optical connector 10.

It should be understood that the structure of optical coupler 60 is not limited to being what described hereinbefore. For example, teeth 26 on optical connector 10 and tooth 36 on fiber retainer 30 are optional features of optical coupler 60. In addition, optical coupler 60 is not limited to coupling optical cable 50 to VCSEL 62. Optical coupler 60 can be used to couple an optical fiber to any kind of optoelectric devices such as, for example, light emitting diodes, photodetectors, etc. In addition, VCSEL 62 can be replaced with several optoelectric devices with their optical regions aligned to corresponding optical fibers in optical cable 50. In an alternative embodiment, a hole is formed in sidewall 14 of optical connector 10. The hole provides a passage or an access to pawl 45. An elongated element, e.g., a stick, can be inserted through the hole to disengage pawl 45 from catch 25, thereby uncoupling optical cable 50 from VCSEL 62.

Figure 7:
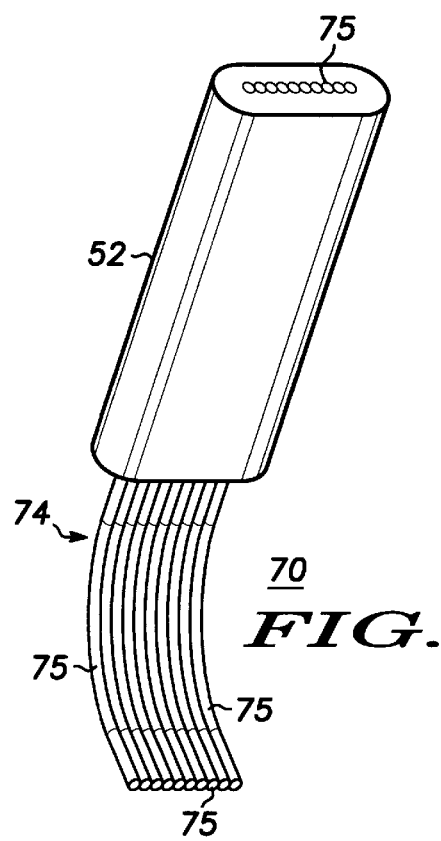
FIG. 7 illustrates another optical cable in accordance with the present invention.

FIG. 7 illustrates an optical cable 70 in accordance with the present invention. Optical cable 70 includes a plurality of optical fibers 75 in a collinear arrangement and protected by a sheath 52. Sheath 52 is absent from a portion 74 of the optical fibers. Optical cable 70 is structurally similar to optical cable 50 shown in FIG. 5. A difference between optical cable 50 and optical cable 70 is that unlike portion 54 of optical cable 50 shown in FIG. 5, the optical fibers in portion 74 of optical cable 70 are not bundled together. It should be noted that portion 74 of optical cable 70 is not bent in its natural state. FIG. 7 shows the state of optical cable 70 when it is inserted between an optical connector and a fiber retainer as described hereinafter.

Figure 8:
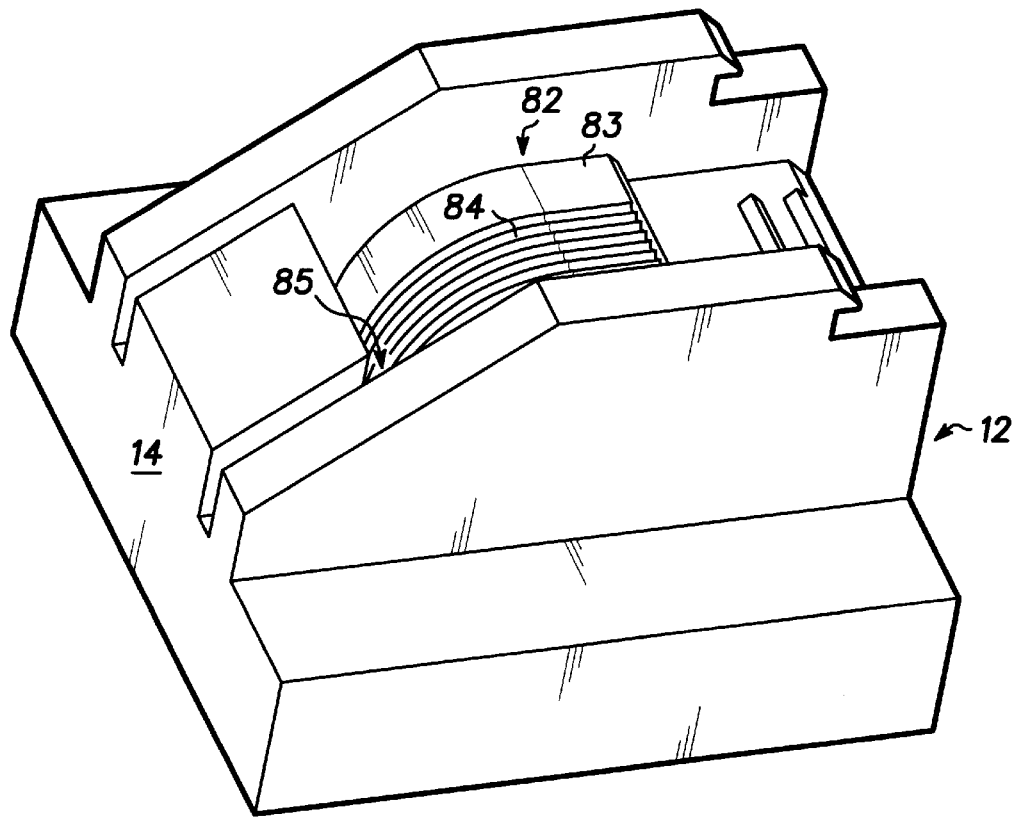
FIG. 8 is an isometric view of an optical connector in accordance with a second embodiment of the present invention.

FIG. 8 is an isometric view of an optical connector 80 in accordance with a second embodiment of the present invention. The structure of optical connector 80 is similar to that of optical connector 10 shown in FIGS. 1 and 2. However, optical connector 80 has a fiber guide 82 that is different from fiber guide 18 of optical connector 10. More particularly, fiber guide 82 has a plurality of grooves 84 formed thereon and substantially parallel to each other. Grooves 84, which are sometimes also referred to as furrows or trenches, extend from a portion 83 of fiber guide 82 adjacent sidewall 12 to a portion 85 of fiber guide 82 adjacent sidewall 14. Preferably, the number of grooves 84 on fiber guide 82 is at least equal to the number of optical fibers in an optical cable, e.g., optical cable 70 shown in FIG. 7, coupled to an optoelectric device using optical connector 80.

Figure 9:
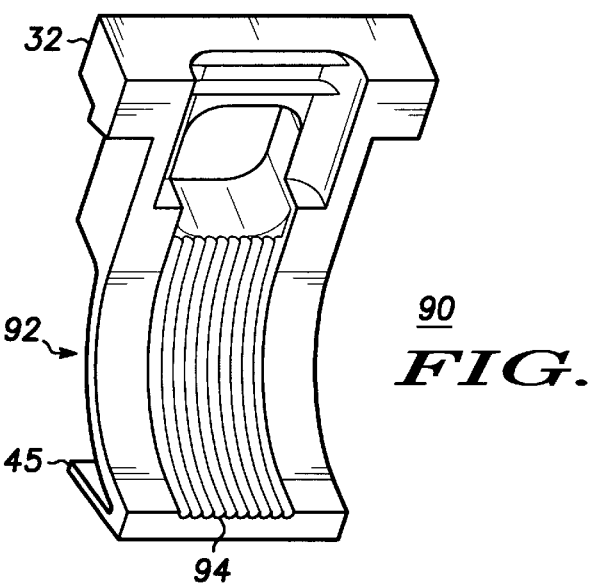
FIG. 9 is an isometric view of another optical fiber retainer in accordance with the present invention.

FIG. 9 illustrates an optical fiber retainer 90 in accordance with the present invention. Fiber retainer 90 is structurally similar to fiber retainer 30 shown in FIGS. 3 and 4. However, fiber retainer 90 has a flexure 92 that is different from flexure 42 of fiber retainer 30. More particularly, flexure 92 has a plurality of grooves 94 formed thereon and parallel to each other. Grooves 94 are sometimes also referred to as furrows or trenches. Preferably, the number of grooves 94 on flexure 92 is at least equal to the number of optical fibers in an optical cable, e.g., optical cable 70 shown in FIG. 7, coupled to an optoelectric device using fiber retainer 90.

Optical connector 80 of FIG. 8 and fiber retainer 90 of FIG. 9 couple optical cable 70 of FIG. 7 to an optoelectric device, e.g., optoelectric device 62 shown in FIG. 6, to form an optical coupler in a process similar to that of forming optical coupler 60 of FIG. 6. Preferably, grooves 94 on fiber retainer 90 match grooves 84 on optical connector 80. In addition, grooves 84 and 94 preferably match the pattern of optical regions on the optoelectric device, e.g., the apertures on VCSEL 62 on optoelectric board 64 (shown in FIG. 6). When optical cable 70 is inserted between optical connector 80 and fiber retainer 90, each of optical fibers 75 is inserted into a corresponding channel formed by grooves 84 and 94. Because the patterns of grooves 84 and 94 match the pattern of the optical regions on the optoelectric device, the tips of optical fibers 75 are aligned to corresponding optical regions on the optoelectric device. By forming grooves 84 and 94 on optical connector 80 and fiber retainer 90, respectively, and aligning the optical regions on the optoelectric device to grooves 84 and 94, an accurate alignment between optical fibers 75 and the optical regions is achieved. Further, this accurate alignment is achieved regardless of possible variations in the arrangement of optical fibers 75 in the optical cable 70.

It should be understood that optical cable 70 is not limited to being coupled to an optoelectric device via an optical coupler that includes both optical connector 80 and fiber retainer 90. For example, optical cable 70 can be coupled to an optoelectric device via an optical coupler that includes optical connector 80 of FIG. 8 and fiber retainer 30 of FIGS. 3 and 4. Likewise, optical cable 70 can also be coupled to an optoelectric device via an optical coupler that includes optical connector 10 of FIGS. 1 and 2 and fiber retainer 90 of FIG. 9.

Figure 10:
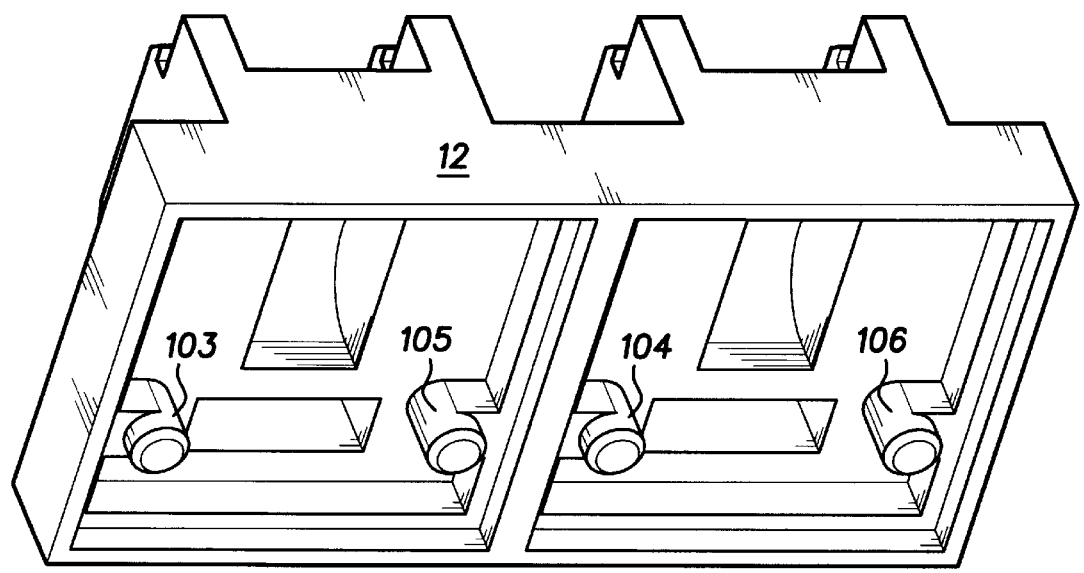
FIG. 10 is an isometric view of an optical connector in accordance with a third embodiment of the present invention.

FIG. 10 is an isometric view of an optical connector 100 in accordance with a third embodiment of the present invention. The structure of optical connector 100 is similar to that of optical connector 10 shown in FIGS. 1 and 2. However, optical connector 100 is a dual-component optical connector that couples two optical cables to two optoelectric devices. A feature in optical connector 100 but absent in optical connector 10 is alignment pins 103, 105, 104, and 106.

Figure 11:
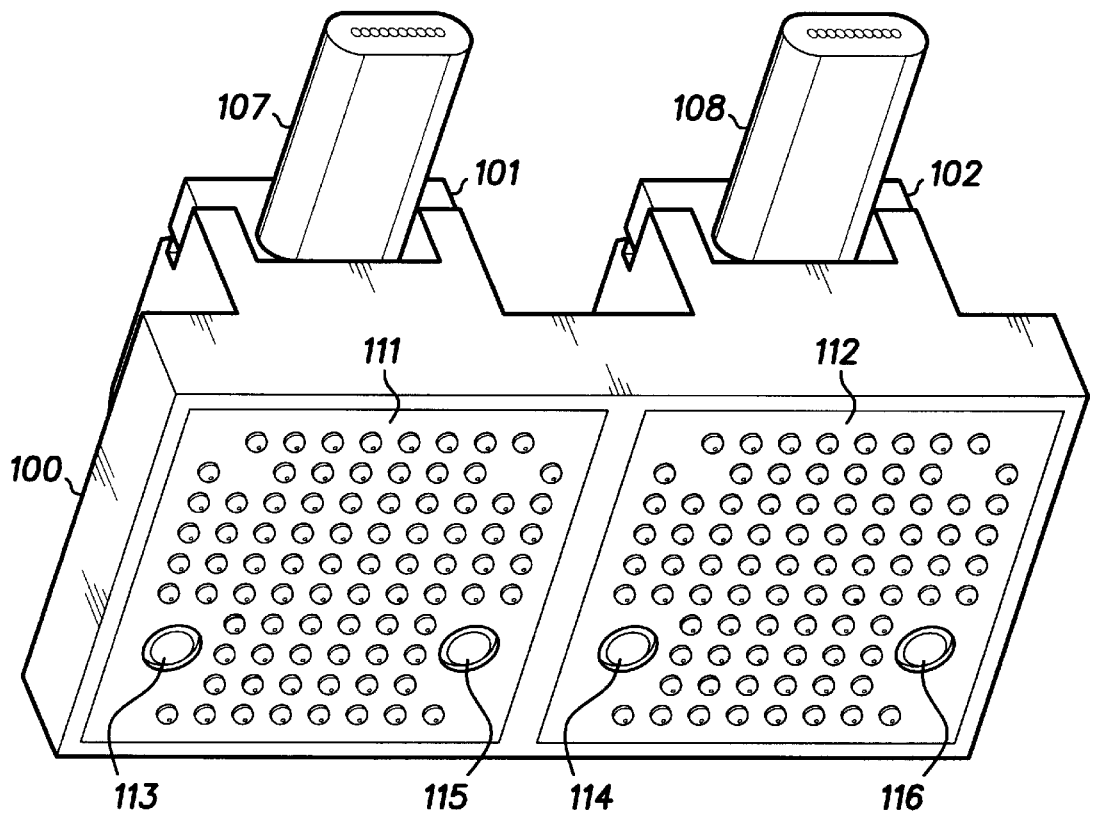
FIG. 11 is an isometric view of an optical coupler in accordance with the third embodiment of the present invention.

FIG. 11 is an isometric view of an optical coupler 110 in accordance with the third embodiment of the present invention. Optical coupler 110 includes optical connector 100, optoelectric boards 111 and 112, fiber retainers 101 and 102 and optical cables 107 and 108. Fiber retainers 101 and 102 are structurally similar to fiber retainer 30 shown in FIGS. 3 and 4. Further, optical cables 107 and 108 are structurally similar to optical cable 50 shown in FIG. 5. There is an optoelectric device (not shown) mounted on each of optoelectric boards 111 and 112. The process of assembling optical coupler 110 includes mounting optoelectric boards 111 and 112 to optical connector 100, mounting fiber retainers 101 and 102 to optical connector 100, inserting optical cables 107 and 108 into optical connector 100, and securing the optical cables 107 and 108 to optical connector 100.

Mounting optoelectric boards 111 and 112 to optical connector 100 includes aligning the optoelectric devices (not shown) on optoelectric boards 111 and 112 to corresponding fiber guides on optical connector 100, and attaching optoelectric boards 111 and 112 to optical connector 100. Using a pattern identification technique, the apertures (not shown) on the optoelectric devices are identified. The positions of optoelectric boards 111 and 112 relative to optical connector 100 are adjusted so that the apertures are aligned to corresponding fiber guides. While the apertures are aligned to the fiber guides, alignment holes 113 and 115 are formed on the optoelectric board 111, and alignment holes 114 and 116 are formed on optoelectric board 112. On optoelectric board 111, alignment hole 113 is aligned with alignment pin 103, and alignment hole 115 is aligned with alignment pin 105. On optoelectric board 112, alignment hole 114 is aligned with alignment pin 104, and alignment hole 116 is aligned with alignment pin 106. Accordingly, when optoelectric boards 111 and 112 are attached to optical connector 100, the apertures of the optoelectric devices (not shown) on optoelectric boards 111 and 112 are aligned to corresponding fiber guides on optical connector 100. Optoelectric boards 111 and 112 can be attached to optical connector 100 using a fastener, a glue, etc. Alternatively, optoelectric boards 111 and 112 can be snapped into a clip (not shown) formed on optical connector 100.

In a process similar to that described hereinbefore with reference to FIG. 6, fiber retainers 101 and 102 are inserted into optical connector 100. Optical cables 107 and 108 are inserted into the spaces between the flexures of fiber retainers 101 and 102 and corresponding fiber guides, so that the ends or tips of the optical fibers are adjacent and directly over the apertures on the surface of corresponding optoelectric devices. The lids of fiber retainers 101 and 102 are then pushed toward and snap into optical connector 100, thereby securing optical cables 107 and 108 to optical connector 100.

It should be understood that the structure of optical coupler 110 is not limited to being what described hereinbefore. For example, optical connector 100 can have grooves formed on its fiber guides, like grooves 84 on fiber guide 82 of optical connector 80 shown in FIG. 8. Likewise, fiber retainers 101 and 102 can have grooves formed on their flexures, like grooves 94 on flexure 92 of fiber retainer 90 shown in FIG. 9. In these situations, optical coupler 110 couples two optical cables which are structurally similar to optical cable 70 shown in FIG. 7 to two optoelectric devices mounted on corresponding optoelectric boards 111 and 112.

Figure 12:
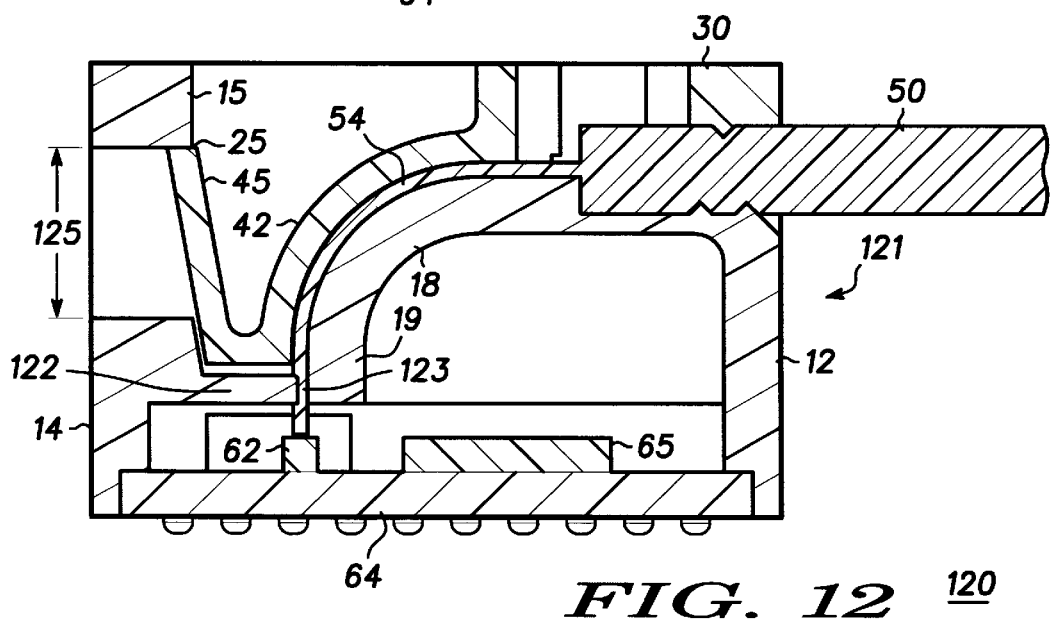
FIG. 12 is a cross-sectional view of an optical coupler in accordance with a fourth embodiment of the present invention.

FIG. 12 illustrates, in a cross-sectional view, an optical coupler 120 in accordance with a fourth embodiment of the present invention. Optical coupler 120 includes an optical connector 121 that cooperates with fiber retainer 30 to couple optical cable 50 to optoelectric device 62. The structure of optical connector 121 is similar to that of optical connector 10 shown in FIGS. 1 and 2. However, optical connector 121 has a block 122 that is absent in optical connector 10. Block 122 extends from sidewall 14 and is partially connected to fiber guide 18. More particularly, block 122 and fiber guide 18 form an optical fiber alignment opening 123 adjacent portion 19 of fiber guide 18. As shown in FIG. 12, optical fiber alignment opening 123 receives the ends of the optical fibers in optical cable 50 and aligns them to the apertures on optoelectric device 62. Optical connector 121 also has a hole 125 in sidewall 14.

The process of coupling optical cable 50 to optoelectric device 62 is similar to that described hereinbefore with reference to FIG. 6. Optoelectric board 64 is mounted to optical connector 121 while apertures on optoelectric device 62 are aligned to optical fiber alignment opening 123. Flexure 42 of fiber retainer 30 is inserted between sidewall 14 and fiber guide 18 of optical connector 121 with Pawl 45 snapped into catch 25. Portion 54 of optical cable 50 is inserted into a space between flexure 42 and fiber guide 18 until the tip of the optical fiber bundle is in optical fiber alignment opening 123. Lid 32 of fiber retainer 30 is pushed toward sidewall 11 of optical connector 121 thereby securing optical cable 50 in optical connector 121. Optical cable 50 can be uncoupled or decoupled from optoelectric device 62 by disengaging pawl 45 from catch 25, separating fiber retainer 30 from optical connector 121, and removing optical cable 50 from optical connector 121. Pawl 45 can be disengaged from catch 25 by pushing pawl 45 away from sidewall 14 through hole 125. Therefore, hole 125 is also referred to as a disengagement hole or a decoupling hole.

It should be understood that the structure of optical coupler 120 is not limited to being what described hereinbefore. For example, optical connector 121 can have alignment pins like those in optical connector 100 shown in FIG. 10. Fiber guide 18 of optical connector 121 can have grooves like those of optical connector 80 shown in FIG. 8. Further, fiber retainer 30 in optical coupler 120 can be replaced by fiber retainer 90 shown in FIG. 9. Accordingly, optical cable 50 in optical coupler 120 can be replace with optical cable 70 shown in FIG. 7. When optical cable 70 is used, optical fiber alignment opening 123 in optical connector 121 is preferably comprised of a plurality of channels, each channel receiving a corresponding optical fiber in optical cable 70. In addition, optical connector 121 can be dual-component optical connector like optical connector 100 shown in FIG. 10. Optical connector 121 can also have more than two components and couples a plurality of optical cables to a plurality of optoelectric devices.

Figure 13:
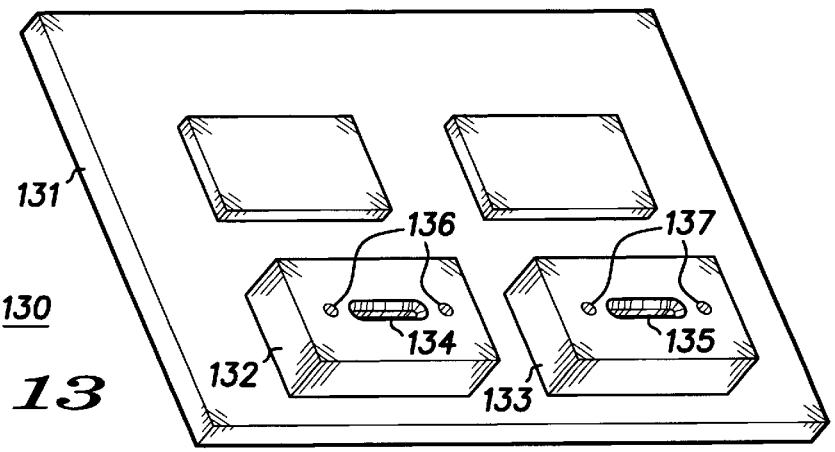
FIGS. 13 and 14 show an optoelectric board assembly in accordance with a fifth embodiment of the present invention.
Figure 14:
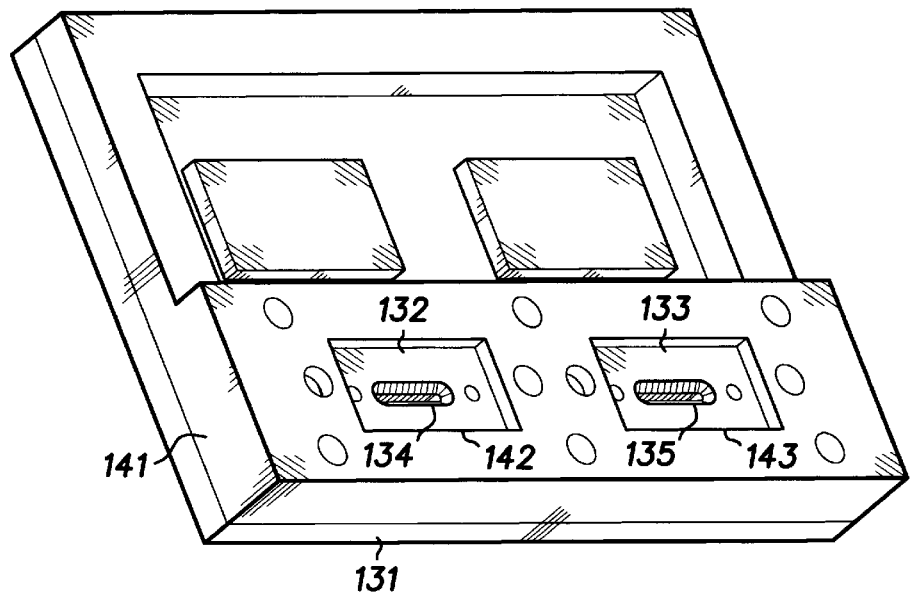

FIGS. 13 and 14 illustrate, in isometric views, an optoelectric board assembly 130 in accordance with a fifth embodiment of the present invention. By way of example, optoelectric board assembly 130 is a dual-component board assembly that includes two optoelectric devices. FIG. 13 shows optoelectric board assembly 130 comprised of an optoelectric board 131 and alignment blocks 132 and 133 mounted thereon. Under each of alignment blocks 132 and 133, there is an optoelectric device (not shown) such as, for example, a multi-channel VCSEL, a multi-channel photodetector, or the like. Alignment block 132 has an opening 134 and alignment holes 136. Alignment holes 136 are used to align alignment block 132 with an optoelectric device die thereunder so that opening 134 is directly over the apertures of the optoelectric device. Alignment block 133 has an opening 135 and alignment holes 137. Alignment holes 137 are used to align alignment block 133 with an optoelectric device die thereunder so that opening 135 is directly over the apertures of the optoelectric device. Referring now to FIG. 14, a block retainer 141 secures alignment blocks 132 and 133 to optoelectric board 131. Block retainer 141 has openings 142 and 143. Opening 142 exposes opening 134 of alignment block 132, and opening 143 exposes opening 135 of alignment block 133. By way of example, block retainer 141 is glued to optoelectric board 131.

It should be understood that the structure of optoelectric board assembly 130 is not limited to being that described hereinbefore. For example, block retainer 141 can be attached to optoelectric board via screws or other types of fasteners. In addition, block retainer 141 is an optional feature in optoelectric board assembly 130. In an alternative embodiment, optoelectric board assembly does not include block retainer 141, and alignment blocks 132 and 133 are attached to optoelectric board 131 using fasteners such as, for example, screws, rivets, and the likes. There can be more than one optoelectric device under either alignment block 132 or alignment block 133. Optoelectric board assembly 130 is not limited to being a dual-component board assembly that includes two optoelectric devices. Optoelectric board assembly can include any number of optoelectric devices such as, for example, one, three, four, five, etc.

Figure 15:
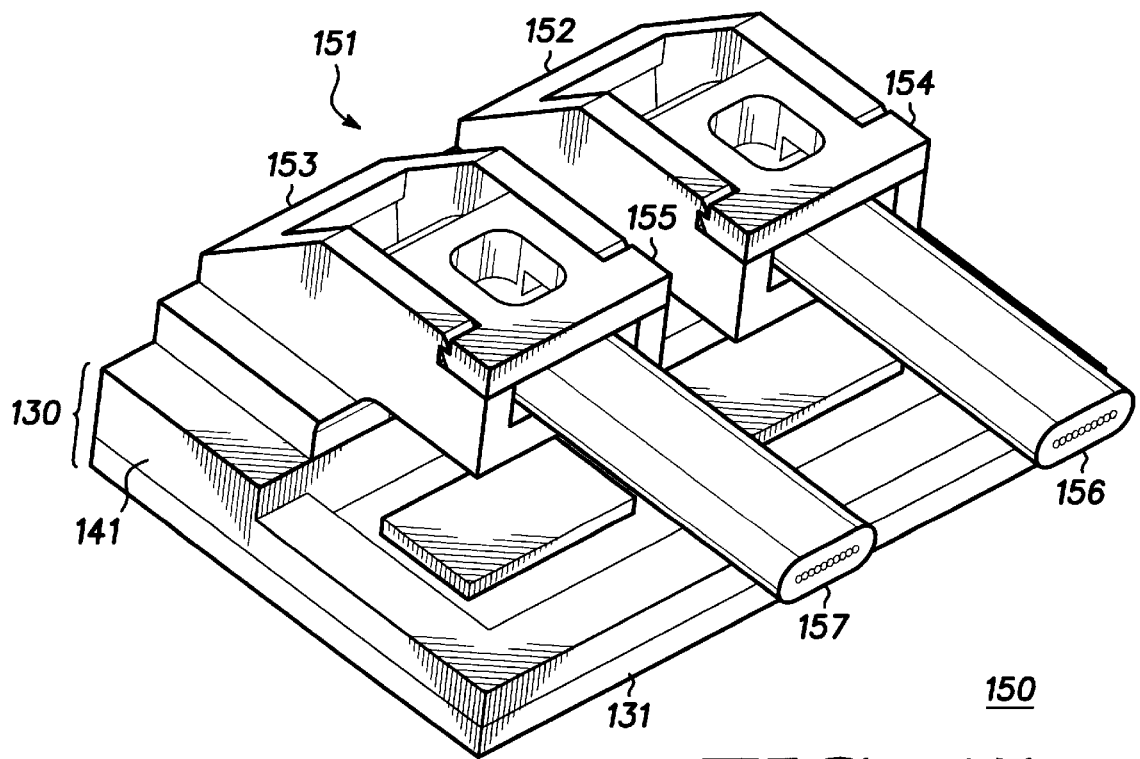
FIG. 15 is an isometric view of an optical coupler in accordance with the fifth embodiment of the present invention.

FIG. 15 is an isometric view of an optical coupler 150 in accordance with the fifth embodiment of the present invention. By way of example, optical coupler 150 is a dual-component optical coupler. Optical coupler 150 includes a dual-component optical connector 151. A first component 152 of optical connector 151 and a fiber retainer 154 cooperate to couple an optical fiber 156 to an optoelectric device under alignment block 132 (shown in FIG. 14) of optoelectric board assembly 130. A second component 153 of optical connector 151 and a fiber retainer 155 cooperate to couple an optical fiber 157 to an optoelectric device under alignment block 133 (shown in FIG. 14) of optoelectric board assembly 130. Optical cables 156 and 157 are structurally similar to optical cable 50 shown in FIG. 5.

The process of coupling optical cables 156 and 157 to respective optoelectric devices mounted on optoelectric board assembly 130 is similar to that described hereinbefore with reference to FIG. 6. When optical cable 156 is inserted into a space between component 152 of optical connector 151 and fiber retainer 154, the tips of the optical fibers (not shown) in optical cable 156 are inserted into opening 134 of alignment block 132. Thus, the tips of the optical fibers in optical cable 156 are aligned to the optical region of the optoelectric device under alignment block 132. When optical cable 157 is inserted into a space between component 153 of optical connector 151 and fiber retainer 155, the tips of the optical fibers (not shown) in optical cable 157 are inserted into opening 135 of alignment block 133. Thus, the tips of the optical fibers in optical cable 157 are aligned to the optical region of the optoelectric device under alignment block 133.

It should be understood that the structure of optical coupler 150 is not limited to being what described hereinbefore. For example, optical connector 151 can have alignment pins like those in optical connector 10 shown in FIG. 10. The fiber guides (not shown in FIG. 15) of optical connector 151 can have grooves like those of optical connector 80 shown in FIG. 8. Further, fiber retainers 154 and 155 in optical coupler 150 can have grooves like those of fiber retainer 90 shown in FIG. 9. Accordingly, optical cables 156 and 157 in optical coupler 150 can be replace by optical cables like optical cable 70 shown in FIG. 7. When optical cable 70 is coupled to an optoelectric device under alignment block 132 (shown in FIGS. 13 and 14), opening 134 in alignment block 132 is preferably comprised of a plurality of small channels, each channel receiving a corresponding optical fiber in optical cable 70 and directly above an aperture on the optoelectric device under alignment block 132. When optical cable 70 is coupled to an optoelectric device under alignment block 133 (shown in FIGS. 13 and 14), opening 135 in alignment block 133 is preferably comprised of a plurality of small channels, each channel receiving a corresponding optical fiber in optical cable 70 and directly above an aperture on the optoelectric device under alignment block 133.

By now it should be appreciated that an optical coupler and a method for coupling an optical fiber to an optoelectronic device have been provided. In accordance with the present invention, the optical coupler is comprised of an optical connector coupled to a circuit board. An optical fiber is inserted into the optical connector and bent inside the optical connector. Therefore, present invention provides a package that having optical fibers oblique or parallel to the circuit board without the need of mounting the optoelectric device perpendicular to the circuit board. Compared with the prior art optical coupling techniques, the optical coupler of the present invention reduces optical and electrical signal loss, thereby enhancing performance of the optoelectric devices. Further, the optical coupler of the present invention is simple, easily manufacturable, and cost efficient.

What is claimed is:

1. An optical coupler comprising a connector, wherein the connector includes:

a first sidewall;

a second sidewall having an inner surface facing the first sidewall;

a third sidewall coupled between the first sidewall and the second sidewall, and a fourth sidewall opposite to the third sidewall and coupled between the first sidewall and the second sidewall;

a fiber guide having a first portion extending from the first sidewall toward the second sidewall, and a second portion adjacent and substantially parallel to the second sidewall;

an optoelectric board mounted to the connector, the optoelectric board having a first edge, a second edge, a third edge, and a fourth edge aligned to the first sidewall, the second sidewall, the third sidewall, and the fourth sidewall, respectively; and an optoelectric device attached to the optoelectric board and having an aperture facing the second portion of the fiber guide.

2. The optical coupler of claim 1, wherein:

the connector further comprises an alignment pin; and the optoelectric board further has an alignment hole aligned to the alignment pin of the connector.

3. The optical coupler of claim 1, wherein:

the connector further has an optical fiber alignment opening adjacent the second portion of the fiber guide; and the aperture of the optoelectric device is aligned to the optical fiber alignment opening of the connector.

4. The optical coupler of claim 1, further comprising an alignment block attached to the optoelectric board and over the optoelectric device, the alignment block having an opening aligned to the aperture of the optoelectric device.

5. The optical coupler of claim 4, further comprising a retainer, wherein the retainer includes:

a flexure inserted between the second portion of the fiber guide and the inner surface of the second sidewall of the connector; and a lid over the first sidewall of the connector.

6. The optical coupler of claim 5, wherein the retainer has a groove on the flexure and facing the fiber guide.

7. The optical coupler of claim 5, wherein:

the connector has a tab adjacent the first sidewall; and the-lid has a protrusion cooperating with the tab to secure the lid on the connector.

8. The optical coupler of claim 5, further comprising a cable that includes an optical fiber having a first portion between the fiber guide and the flexure, and a second portion between the lid and the first sidewall, the first portion of the optical fiber having a tip adjacent the second portion of the fiber guide.

9. The optical coupler of claim 8, wherein the first sidewall has a notch therein and the notch has a tooth thereon, the tooth gripping and securing the cable.

10. The optical coupler of claim 8, wherein the lid has a tooth facing toward the first sidewall, the tooth gripping and securing the cable.

11. The optical coupler of claim 5, wherein:

the second sidewall of the connector has a catch on the inner surface; and the flexure has a pawl that engages the catch to secure the flexure to the connector when the flexure is inserted between the fiber guide and the inner surface of the second sidewall.

12. The optical coupler of claim 11, wherein the second sidewall has a hole therein adjacent the catch, through which an elongated element can be inserted to disengage the pawl from the catch.

13. An optical fiber coupler, comprising:
a connector including a first sidewall and a second sidewall opposite to each other, and a fiber guide between the first sidewall and the second sidewall, the fiber guide having a first portion extending from the first sidewall toward the second sidewall, and a second portion adjacent the second sidewall and substantially perpendicular to the first portion of the fiber guide;
an optoelectric board mounted to the connector;
an optoelectric device attached to the optoelectric board and having at least one aperture adjacent the second portion of the fiber guide;
an optical cable that includes at least one optical fiber over the fiber guide, the at least one optical fiber having a tip aligned to the at least one aperture of the optoelectric device; and
a retainer mounted to the connector, the retainer having a flexure conformal to the fiber guide and pressing the at least one optical fiber to the fiber guide.

14. The optical fiber coupler of claim 13, wherein the second sidewall has a hole therein, through which an elongated element can be inserted to disengage the retainer from the connector.

15. The optical fiber coupler of claim 13, wherein:
the connector further comprises at least one alignment pin adjacent the second portion of the fiber guide; and
the optoelectric board has at least one alignment hole aligned to the at least one alignment pin.

16. The optical fiber coupler of claim 13, wherein the connector has at least one tooth gripping and securing the optical cable.

17. The optical fiber coupler of claim 13, wherein the fiber guide has at least one groove thereon extending from the first portion of the fiber guide to the second portion of the fiber guide, the at least one groove receiving the at least one optical fiber.

18. The optical fiber coupler of claim 13, wherein:
the connector further has an alignment opening adjacent the second portion of the fiber guide, the alignment opening receiving the tip of the at least one optical fiber; and the at least one aperture of the optoelectric device is aligned to the alignment opening of the connector.

19. The optical fiber coupler of claim 13, further comprising an alignment block attached to the optoelectric board and over the optoelectric device, the alignment block having an opening aligned to the at least one aperture of the optoelectric device and receiving the tip of the at least one optical fiber.

20. A method for coupling an optical fiber to an optoelectric device, comprising the steps of:
providing a connector which includes a fiber guide having a first portion extending from a first sidewall of the connector, and a second portion substantially perpendicular to the first portion, the connector having a plurality of sidewalls surrounding the second portion of the fiber guide;
attaching the optoelectric device to a board;
coupling the board to the connector including cutting the board to form a plurality of edges of the board matching the plurality of sidewalls of the connector; and
placing a first portion of the optical fiber on the fiber guide so that an end of the optical fiber is opposite to the optoelectric device.

21. The method as claimed in claim 20, wherein:
the step of providing a connector further forming an alignment opening adjacent the second portion of the fiber guide;
the step of coupling the board to the connector further includes aligning the optical region of the optoelectric device to the alignment opening; and
the step of placing a first portion of the optical fiber on the fiber guide further includes inserting the end of the optical fiber into an alignment opening.

22. The method as claimed in claim 20, further comprising the steps of:
attaching an alignment block to the board, the alignment block having an opening aligned to an optical region of the optoelectric device; and
inserting the end of the optical fiber into the opening of the alignment block.

* * * * *